United States Patent [19]  [11] 4,353,834
Langdon  [45] Oct. 12, 1982

[54] CARBONATE AND CARBOXYLIC ACID ESTER GROUP-CONTAINING NON-IONIC SURFACE-ACTIVE AGENTS

[75] Inventor: William K. Langdon, Grosse Ile, Mich.

[73] Assignee: BASF Wyandotte Corporation, Wyandotte, Mich.

[21] Appl. No.: 229,048

[22] Filed: Mar. 13, 1981

[51] Int. Cl.$^3$ ............... C07C 68/00; C07C 69/96
[52] U.S. Cl. ............... 260/404.5; 260/463; 560/9; 560/12; 560/13; 560/14; 560/22; 564/80; 564/82; 564/152; 564/153; 564/155; 564/158; 564/159
[58] Field of Search .... 260/463, 404.5 PA, 404.5 EO, 260/404.5 R; 560/9, 12, 13, 14, 22; 564/80, 82, 152, 153, 155, 158, 159

[56] References Cited

U.S. PATENT DOCUMENTS

| | | | |
|---|---|---|---|
| 4,072,704 | 2/1978 | Langdon | 260/463 |
| 4,178,434 | 12/1979 | Langdon | 528/405 |
| 4,191,820 | 3/1980 | Langdon | 528/405 |
| 4,207,421 | 6/1980 | Scardera et al. | 568/625 |
| 4,261,925 | 4/1981 | Tomalia et al. | 260/404.5 PA |

Primary Examiner—Arthur P. Demers
Attorney, Agent, or Firm—Bernhard R. Swick

[57] ABSTRACT

Biodegradable non-ionic surface-active agents containing carbonate groups can be prepared by reacting hydrophilic polyoxyalkylene glycols derived from the same or different alkylene oxides with hydrophobic amides or sulfonamides. The compositions of the invention contain both hydrophilic and hydrophobic groups in the molecule making them suitable for use as surface-active agents.

10 Claims, No Drawings

CARBONATE AND CARBOXYLIC ACID ESTER GROUP-CONTAINING NON-IONIC SURFACE-ACTIVE AGENTS

BACKGROUND OF THE INVENTION

1. Field of the Invention

This invention relates to non-ionic surface-active agents containing carbonate or carboxylic acid ester groups.

2. Description of the Prior Art

A wide variety of non-ionic surface-active agents are known in the art. Usually, these are stable in acid, basic and neutral media. In addition, many non-ionic surface-active agents are not easily biodegraded making such surface-active agents upon disposal a source of water pollution. In some applications, it is necessary or at least highly desirable to modify or change the surface activity of a surface-active agent at some critical point in an operation utilizing such agents. For example, in the recovery of oil and waxes from raw wool by emulsification there is obtained an emulsion in water which is not easily broken so as to allow recovery of the oils and waxes for the purposes of disposal. In addition, commercial laundry effluents containing non-ionic surface-active agents are a source of water pollution. In the recovery of petroleum, emulsions are formed which are not easily broken without the use of certain complex and expensive demulsifying agents.

The surface-active agents of the invention are suited for use under the conditions described above and yet can be changed in surface activity properties by treatment with a dilute basic compound and/or heating in order to degrade the surface-active compounds by hydrolytic cleavage of the molecule. These compounds can be made so as to exhibit low or high foaming, good detergency, and low or high cloud points as desired.

In U.S. Pat. No. 4,072,704, there are disclosed multi-block coupled polyoxyalkylene copolymer surfactants prepared by reacting bifunctional compounds to form polycarbonate esters. These materials are formed of polyoxyalkylene units coupled by reaction with an alkyl carbonate such as diethyl carbonate. There is no indication that amides or sulfonamides are useful in the preparation of such surfactants. Biodegradable, alkali-stable, non-ionic surfactants are disclosed in U.S. Pat. No. 4,207,421 as containing the residues of a linear aliphatic alcohol, ethylene oxide, and a propylene oxide or butylene oxide residue cap.

High molecular weight polycarbonates are disclosed in U.S. Pat. Nos. 3,248,414; 3,248,415; and 3,248,416. These are prepared, for instance, by reacting ethylene carbonate and ethylene oxide in the presence of a basic catalyst. The hydroxyl-terminated compositions range in molecular weight from 700 to 5000 and react with isocyanates to form urethanes.

SUMMARY OF THE INVENTION

It has now been discovered that non-ionic surface-active agents can be prepared having surface-active properties which can be destroyed or changed by exposure to heat and/or basic conditions. These are carbonate- or carboxylic acid ester-coupled hydrophilic polyoxyalkylene glycols containing at least one terminal hydrophobic group derived from a primary or secondary carboxamide, hereafter referred to as an amide, or a primary or secondary sulfonamide. The polyoxyalkylene glycols can be homopolymers, block copolymers, or heteric copolymers prepared respectively by reacting ethylene oxide or ethylene oxide and alkylene oxides having 3 to 4 carbon atoms with a base compound containing at least one active hydrogen. Because the surface-active characteristics of the non-ionic surface active agents of the invention can be destroyed or changed by exposure to conditions which promote hydrolytic cleavage of the molecule, the surfactants of the invention containing ester linkages are more desirable from an ecological standpoint than the many prior art non-ionic surface-active agents.

DETAILED DESCRIPTION OF THE INVENTION

This invention relates to non-ionic surface-active compositions containing carbonate or carboxylic ester linkages in addition to the usual ether linkages present in most non-ionic surface-active agents. As a consequence of the presence of the ester linkages, the surface-active agents of the invention are more susceptible to hydrolytic cleavage as compared to most non-ionic surface-active agents known in the prior art.

In accordance with this invention, hydrophilic polyoxyalkylene glycols and hydrophobic amides or sulfonamides can be selectively coupled by i.e. alternating hydrophilic and hydrophobic groups, by reaction with, a carbonate or carboxylic acid ester coupling agent, for instance, a dialkyl carbonate having 1 to about 7 carbon atoms in each alkyl group. The surface-active agents of the invention are terminated on at least one end of the molecule with the residue of the hydrophobic amide or sulfonamide. The molar quantities of the carbonate used for coupling are at least equal to those quantities of the hydrophobic polyoxyalkylene glycols utilized in order to provide at least a single terminal amide or sulfonamide residue. Where each terminal portion of the molecule contains said residue, more coupling agent is required, namely, up to 1.5 moles thereof based upon the molar quantity of the hydrophilic polyoxyalkylene glycol utilized.

The surface-active agents of the invention have the formulas

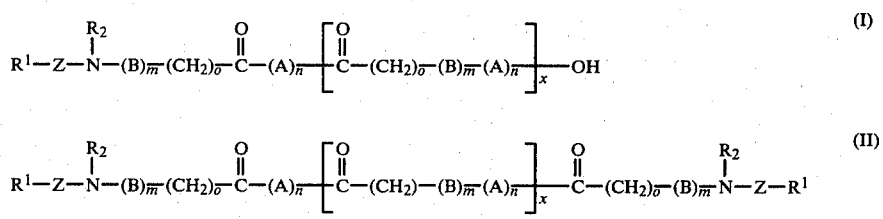

wherein $R^1$ is the residue of a hydrophobic aliphatic, or aliphatic-aromatic compound selected from the group consisting of at least one of an alkyl, alkylaryl, arylalkyl and alkylarylalkyl group wherein each alkyl group contains about 6 to about 30 carbon atoms; $R^2$ is hydrogen, alkyl or substituted alkyl of 1 to about 4 carbon atoms; wherein A is the residue of a hydrophilic polyoxyalkylene glycol derived from the same or different alkylene oxides; wherein said glycol is selected from the group consisting of at least one of the heteric, block or homopolymer polyoxyalkylene glycols derived respectively from the reaction of ethylene oxide and alkylene oxides having 3 to 4 carbon atoms or ethylene oxide with an active hydrogen compound having at least two active hydrogen atoms; wherein B is C=O, m is 0 or 1, Z is C=O or O=S=O, x is an integer of 1 to about 20, preferably 1 to about 10; n is individually selected from integers such that the molecular weight of A is about 104 to about 1000; and wherein o is an integer of 0 to about 4, and when o is 0, m is 0.

The surfactant compositions of the invention are unexpectedly formed in a selective coupling configuration in which the amide or sulfonamide is coupled with a polyoxyalkylene glycol, as indicated by the water-solubility of the product obtained. The expected random coupling of the reactants such that insoluble species are formed does not occur. The surfactants of the invention can be easily prepared by admixing all the reactants in a reaction zone and heating the reactants to reflux temperature in the presence of a basic catalyst and a water-immiscible organic reaction solvent. The coupling agents of the invention are lower dialkyl ($C_1$–$C_7$) carbonate esters or lower alkyl ($C_1$–$C_7$) dicarboxylic acid esters having 2 to about 6 carbon atoms in the acid group and 1 to 7 carbon atoms in each alkyl ester group. The alkyl alcohol produced in the reaction is removed by distillation and the crude reaction product is stripped free of unreacted materials to provide the product desired.

The coupling reaction utilizing a dialkyl carbonate or dicarboxylic acid ester can be carried out at a temperature in the range of about 100° to 200° C. in the presence of an alkaline catalyst. Examples of such catalysts are sodium carbonate, potassium carbonate, sodium methoxide, sodium ethoxide, potassium ethoxide, sodium hydroxide, potassium hydroxide, and mixtures thereof. The preferred alkaline catalyst is sodium methoxide. The amount of catalyst employed can vary from about 0.01 percent by weight to about 1 percent by weight based on the total weight of the reactants. The amount of alkaline catalyst is not critical. The coupling reaction with the dialkyl carbonate occurs as the result of an ester interchange. During the reaction, as the temperature is raised from 100° C. to 200° C., an alcohol is produced which is subsequently distilled off thus promoting the ester interchange. The hydrophilic polyoxyalkylene residues are coupled through ester groups to the residue of the monofunctional hydrophobic amide or sulfonamide.

The hydrophilic polyoxyalkylene compounds can be prepared by reacting ethylene oxide or ethylene oxide and an alkylene oxide having 3 to 4 carbon atoms with an active hydrogen base compound having at least two active hydrogen atoms, as is well known to those skilled in this art. Preferably, the base or initiator compounds have molecular weights of less than 100. The term "active hydrogen atom" is well known to those skilled in the art. It is sufficiently labile to react with ethylene, propylene or butylene oxide and it reacts with methyl magnesium iodide, liberating methane according to the classical Zerewitinoff reaction. The hydrogen atoms are members of a functional group such as a hydroxyl group, a phenol group, a carboxylic acid group, a basic nitrogen group such as an amine group, a hydrazine group, an imine group or an amide group. Hydrogen atoms may be activated by proximity to carbonyl groups such as an acetoacetic ester. Examples of active hydrogen compounds, which may be used as base compounds, include ethylene glycol, diethylene glycol, propylene glycol, dipropylene glycol, butylene glycol, amylene glycol, hexylene glycol, heptylene glycol and octylene glycol.

Useful alkylene oxide reactants for the preparation of hydrophilic polyoxyalkylenes are ethylene oxide, and mixtures of ethylene oxide with propylene oxide, butylene oxide and tetrahydrofuran. The hydrophilic polyoxyalkylene polymers can have molecular weights of about 104 to about 1000, preferably about 200 to about 1000. The polyoxyalkylene homopolymers and copolymers employed in this invention are generally prepared by carrying out the condensation reaction of the ethylene oxide or mixed alkylene oxides with the base compound in the presence of an alkaline catalyst in a manner well known to those skilled in the art. Any of the types of catalysts commonly used for alkylene oxide condensation reactions can be employed. Catalysts which can be employed include sodium hydroxide, potassium hydroxide, sodium methylate, sodium ethylate, potassium acetate, sodium acetate, trimethylamine and triethylamine. After the condensation reaction is completed, the catalyst can be removed from the reaction mixture by any known procedure such as neutralization, filtration or ion exchange. The condensation is preferably carried out at elevated temperatures and pressures. The condensation products are then subjected to the coupling reaction described herein to form the products of the invention.

The hydrophobic aliphatic or aliphatic-aromatic amides or sulfonamides useful in the invention include the primary and secondary alkyl amides and sulfonamides having about 6 to about 30 carbon atoms, most preferably about 8 to about 20 carbon atoms, in the alkyl group. The secondary or monofunctional amides and sulfonamides are preferred. Most preferred are the secondary alkyl amides and sulfonamides. Examples of useful monofunctional alkyl amides are as follows: N-methyl-lauramide, N-ethyl-palmitamide, N-butyl-stearamide, and N-(2-hydroxyethyl)caprylamide. Corresponding unsubstituted amides are useful. Useful monofunctional amides include arylalkyl amides such as 8-phenyl-N-ethyl-caprylamide. Useful alkylaryl amides include dodecyl-N-(2-hydroxyethyl)benzamide. Useful alkylarylalkyl amides include 2-(4-octylphenyl)-N-ethylacetamide. Useful alkyl sulfonamides include N-dodecyl-N-butyl-sulfonamide. Useful alkylaryl sulfonamides include 4-dodecylphenyl-N-methyl sulfonamide. Useful arylalkyl sulfonamides include 4-octyl-N-propyl-benzene sulfonamide. Useful alkylarylalkyl sulfonamides include 2-(4-dodecylphenyl)-N-methyl sulfonamide. Corresponding unsubstituted amides and sulfonamides are useful.

Any of the monofunctional hydrophobic amides or sulfonamides set forth above can have substituents which do not contain active hydrogen such as halogen, for example, chlorine, bromine, and iodine, nitrate groups or alkoxy radicals.

The dialkyl esters utilized as coupling agents in the process of the invention are dialkyl carbonates and dialkyldicarboxylic acid esters having 1 to about 7 carbon atoms in each alkyl ester group and 2 to about 6 carbon atoms in the acid group. Examples of useful dialkyl ester coupling agents are dimethyl carbonate, diethyl succinate, diethyl oxylate, diethyl maleate, diethyl glutarate, and diethyl adipate. Preferred coupling agents are diethylcarbonate and diethyl succinate. It is noted that during the coupling reaction, an ester interchange reaction occurs resulting in coupling of the reactants through a carbonate or carboxylic acid ester linkage.

The following examples will further illustrate the method of preparation of the carbonate or carboxylic ester coupled non-ionic surface-active agents of the invention and their surface-active agent characteristics. These examples are not to be considered as limiting the scope of the invention. In the specification, claims and examples which follow, all parts, percentages and proportions are by weight and all temperatures are in degrees centigrade unless otherwise noted.

EXAMPLE 1

This example illustrates the preparation of a carbonate-coupled non-ionic surfactant having two units derived from a polyoxyethylene glycol having a molecular weight of 300 and one unit derived from the monoethanolamide of coconut fatty acids. A one-liter 3-neck distilling flask equipped with a fractionating column and distillation head was charged with 300 grams of polyethylene glycol having a molecular weight of 300, 128 grams of said amide, 130 grams of diethyl carbonate, and 1.5 grams of sodium methoxide. The mixture was heated to a reflux temperature of about 140°–150° C. at which time ethanol began to distill off. An ethanol distillate was collected in the amount of 88.8 grams over a period of 80 minutes during which the flask temperature rose to 190° C. The crude reaction product was vacuum stripped at a temperature of 120° C. for 25 minutes. An additional 9.6 grams of volatiles were collected during the stripping process. To the stirred product, there was added 10 grams of magnesium silicate and the mixture was stirred at 90° to 100° C. for 30 minutes. One gram of filter aid was then added and the product was filtered to yield 393 grams of liquid. A one weight percent solution in water was found to have a pH of 9.0. The cloud point, as measured in a one weight percent aqueous solution, was 41° C. The surface tension of a 0.1 weight percent aqueous solution was 30.3 dynes per centimeter, the Draves sink time utilizing a 0.1 weight percent aqueous solution was 80 seconds.

EXAMPLE 2

This example illustrates the preparation of a diethyl succinate-coupled non-ionic surfactant having three units derived from a polyoxyethylene glycol having a molecular weight of 300 and one unit derived from the monoethanolamide of coconut fatty acids (CMA). A one-liter 3-neck distilling flask equipped with a fractionating column and distillation head was charged with 338 grams of polyethylene glycol having a molecular weight of 300, 96 grams lf CMA, 196 grams of diethyl succinate, and 2 grams of sodium methoxide. The mixture was heated with stirring to reflux. An ethanol distillate was collected in the amount of 94 grams. The crude reaction product was vacuum stripped to a pressure of less than 5 torr. To the stirred product, there was added 10 grams of magnesium silicate and the mixture was stirred at 90° to 100° C. for 30 minutes. One gram of filter aid was then added and the product was filtered. A one weight percent solution in water was found to have a pH of 6.4. The cloud point, as measured in a one weight percent aqueous solution, was 52° C. The surface tension of a 0.1 weight percent aqueous solution was 30 dynes per centimeter.

EXAMPLES 3 AND 4

Examples 1 and 2 are repeated substituting respectively a hydrophilic, heteric and hydrophilic block polyoxyalkylene glycol for the polyethylene glycol of Examples 1 and 2. Useful non-ionic surfactants are produced. The polyoxyalkylene glycols of these examples are prepared by reacting ethylene oxide and propylene oxide with an initiator having 2 active hydrogen atoms.

EXAMPLES 5 AND 6

Example 1 is repeated substituting in turn N-methyl stearamide and N-2-hydroxypropyl amide for the monoethanol amide of cocoanut fatty acid of Example 1. Useful surface active agents are produced.

While this invention has been described with reference to certain specific embodiments, it will be recognized by those skilled in this art that many variations are possible without departure from the scope and spirit of the invention.

The embodiments of the invention in which an exclusive priviledge or property is claimed are defined as follows:

1. A composition of matter having the formula

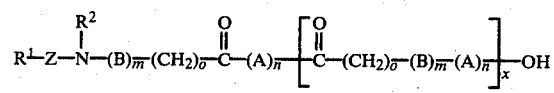

wherein $R^1$ is the residue of a hydrophobic aliphatic or aliphatic-aromatic compound selected from the group consisting of at least one of an alkyl, alkylaryl, arylalkyl, and alkylarylalkyl group; wherein each alkyl group, contains about 6 to about 30 carbon atoms; $R^2$ is hydrogen, alkyl, or substituted alkyl of 1 to about 4 carbon atoms; wherein A is the residue of a hydrophilic oxyalkylene polymer derived from the same or different alkylene oxides; wherein said polymer is selected from at least one of the group consisting of heteric, block, or homopolymer polyalkylene glycols derived respectively from the reaction of ethylene oxide with an alkylene oxide having 3 to 4 carbon atoms or ethylene oxide with an active hydrogen compound having at least two active hydrogen atoms; wherein B is C=O, m is 0 or 1, Z is C=O or O=S=O, x is an integer of 1 to 20, n is individually selected from integers such that the molecular weight of A is about 104 to about 1000; o is an integer of 0 to 4, and when o is 0, m is 0.

2. A composition of matter having the formula

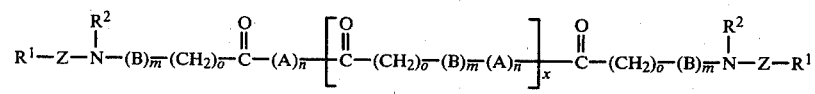

wherein $R^1$ is the residue of a hydrophobic aliphatic or aromatic-aliphatic compound selected from the group consisting of at least one of an alkyl, arylalkyl, alkylaryl and alkylarylalkyl group; wherein each alkyl group contains about 6 to about 30 carbon atoms; $R^2$ is hydrogen, alkyl, or substituted alkyl of 1 to about 4 carbon atoms; wherein A is the residue of a hydrophilic oxyalkylene polymer derived from the same or different alkylene oxides wherein said polymer is selected from the group consisting of heteric, block or homopolymer polyalkylene glycols derived respectively from the reaction of ethylene oxide with an alkylene oxide having 3 to 4 carbon atoms or ethylene oxide with an active hydrogen compound having at least two active hydrogen atoms; wherein B is C=O, m is 0 or 1, Z is C=O or O=S=O, x is an integer of 1 to 20 and n is individually selected from integers such that the molecular weight of A is about 104 to about 1000; and o is an integer of 0 to 4, and when o is 0, m is 0.

3. The composition of claims 1 or 2 wherein $R^1$ is the residue of a monofunctional alkyl amide having about 6 to about 30 carbon atoms.

4. The composition of claims 1 or 2 wherein A is the residue of a polyoxyethylene glycol, and $R^1$ is derived from a monofunctional alkyl amide having about 6 to about 30 carbon atoms.

5. The composition of claims 1 or 2 wherein A is derived from the reaction of a mixture of ethylene oxide and propylene oxide and $R^1$ is derived from a monofunctional fatty amide having about 8 to about 20 carbon atoms.

6. The composition of claim 5 wherein x is an integer of 1 to 10 and said amide is N-methyl stearamide or N-2-hydroxypropylamide.

7. The process of forming a non-ionic, surface-active agent having the formula of claims 1 or 2 comprising
(A) mixing reactants (1) a dialkyl ester coupling agent having 1 to about 7 carbon atoms in each alkyl group, (2) a hydrophilic polyoxyalkylene glycol having a molecular weight of about 104 to about 1000, and (3) a hydrophobic amide or sulfonamide with an alkaline catalyst and a water-immiscible organic reaction solvent;
(B) reacting at the reflux temperature of the mixture in the presence of said water-immiscible organic reaction solvent;
(C) removing the water formed during the reaction azeotropically together with said reaction solvent; and
(D) recovering the desired surface-active agent.

8. The process of claim 7 wherein said amide is a monofunctional amide or sulfonamide which is an aliphatic or aliphatic-aromatic and has about 6 to about 30 aliphatic carbon atoms selected from the group consisting of alkyl, arylalkyl, alkylaryl, and alkylarylalkyl amides.

9. The process of claim 8 wherein (1) said dialkyl ester coupling agent is diethyl carbonate, (2) said polyoxyalkylene glycol is derived by reacting a mixture of ethylene oxide and propylene oxide with an active hydrogen compound having at least two active hydrogens to prepare a polymer having a molecular weight of about 104 to about 1000, and wherein (3) said amide is a monofunctional alkyl amide.

10. The process of claim 8 wherein (1) dialkyl ester coupling agent is diethyl succinate, (2) said polyoxyalkylene glycol is polyethylene glycol, and (3) said amide is a monofunctional alkyl amide having a carbon chain length of about 8 to about 20 carbon atoms.

* * * * *

UNITED STATES PATENT AND TRADEMARK OFFICE
CERTIFICATE OF CORRECTION

PATENT NO. : 4,353,834
DATED : October 12, 1982
INVENTOR(S) : William K. Langdon It is certified that error appears in the above—identified patent and that said Letters Patent is hereby corrected as shown below:

On the title page, "[22] Filed: Mar. 13, 1981" should read -- [22] Filed: Jan. 28, 1981 --.

Signed and Sealed this

Twelfth Day of April 1983

[SEAL]

Attest:

GERALD J. MOSSINGHOFF

Attesting Officer   Commissioner of Patents and Trademarks